(12) United States Patent
Ozawa et al.

(10) Patent No.: US 12,195,023 B2
(45) Date of Patent: *Jan. 14, 2025

(54) VEHICLE CONTROL SYSTEM

(71) Applicant: TS TECH CO., LTD., Asaka (JP)

(72) Inventors: Hidetoshi Ozawa, Shioya-gun (JP); Takayoshi Ito, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,158

(22) Filed: Oct. 3, 2023

(65) Prior Publication Data

US 2024/0025429 A1 Jan. 25, 2024

Related U.S. Application Data

(63) Continuation of application No. 17/940,586, filed on Sep. 8, 2022, now Pat. No. 11,834,027, which is a
(Continued)

(30) Foreign Application Priority Data

Mar. 29, 2017 (JP) ................................. 2017-064778
Mar. 29, 2017 (JP) ................................. 2017-064787
Mar. 29, 2017 (JP) ................................. 2017-064801

(51) Int. Cl.
*B60W 50/08* (2020.01)
*B60N 2/00* (2006.01)
(Continued)

(52) U.S. Cl.
CPC ............. *B60W 50/08* (2013.01); *B60N 2/002* (2013.01); *B60N 2/0244* (2013.01);
(Continued)

(58) Field of Classification Search
CPC ................. B60W 50/08; B60W 40/08; B60W 2040/0872; B60W 50/082; B60N 2/002;
(Continued)

(56) References Cited

U.S. PATENT DOCUMENTS 8,634,980 B1 * 1/2014 Urmson .................. G06T 7/521
701/23
2001/0015547 A1 * 8/2001 Breed ..................... G01S 7/417
280/735
(Continued)

FOREIGN PATENT DOCUMENTS

CN 105579321 A 5/2016
EP 3000651 A1 3/2016
(Continued)

OTHER PUBLICATIONS

Nov. 21, 2017 International Search Report issued in International Patent Application No. PCT/JP2017/034845.
(Continued)

*Primary Examiner* — Adam D Tissot
*Assistant Examiner* — Jean W Charleston
(74) *Attorney, Agent, or Firm* — Oliff PLC

(57) ABSTRACT

A vehicle control system includes a driving controller that switches between autonomous driving an manual driving of a vehicle, a seat whose form is changed between a form during autonomous driving and a form during manual driving that are different from each other, and a seat controller that controls motion of the seat when a form of the seat is changed. If the seat is in a form during autonomous driving, the driving controller does not switch autonomous driving to manual driving when controlling the vehicle.

7 Claims, 6 Drawing Sheets

Related U.S. Application Data continuation of application No. 16/499,017, filed as application No. PCT/JP2017/034845 on Sep. 27, 2017, now Pat. No. 11,465,639.

(51) Int. Cl.

| | | |
|---|---|---|
| *B60N 2/02* | (2006.01) | |
| *B60W 40/08* | (2012.01) | |
| *G05D 1/00* | (2006.01) | |
| *B60N 2/12* | (2006.01) | |
| *B60N 2/14* | (2006.01) | |
| *B60N 2/34* | (2006.01) | |
| *B60R 21/01* | (2006.01) | |
| *B60R 21/207* | (2006.01) | |

(52) U.S. Cl.
CPC ........... *B60W 40/08* (2013.01); *G05D 1/0061* (2013.01); *G05D 1/0088* (2013.01); *B60N 2/0268* (2023.08); *B60N 2/12* (2013.01); *B60N 2/14* (2013.01); *B60N 2/34* (2013.01); *B60R 21/01* (2013.01); *B60R 21/207* (2013.01); *B60R 2021/2074* (2013.01); *B60W 2040/0872* (2013.01)

(58) Field of Classification Search
CPC ...... B60N 2/0244; B60N 2/0268; B60N 2/12; B60N 2/14; B60N 2/34; B60N 2/18; B60N 2/22; B60N 2/838; B60N 2/99; B60N 2/995; B60N 2/04; B60N 2/90; G05D 1/0061; G05D 1/0088; B60R 21/01; B60R 21/207; B60R 2021/2074; B60R 2021/23146; B60R 21/23138
USPC .......................................................... 701/23
See application file for complete search history.

(56) References Cited

U.S. PATENT DOCUMENTS

| | | | |
|---|---|---|---|
| 2011/0285186 A1 | 11/2011 | Demmelmeier et al. | |
| 2016/0082867 A1* | 3/2016 | Sugioka | B60N 2/06 701/49 |
| 2016/0159251 A1* | 6/2016 | Ebina | B62D 1/183 701/49 |
| 2016/0318442 A1 | 11/2016 | James | |
| 2017/0028876 A1* | 2/2017 | Yamada | B60N 2/0224 |
| 2017/0028987 A1 | 2/2017 | Yamada | |
| 2017/0050538 A1* | 2/2017 | Akimoto | B60N 2/0244 |
| 2017/0225567 A1* | 8/2017 | Tsuda | B60Q 1/507 |
| 2017/0303842 A1* | 10/2017 | Yoshida | B60W 50/14 |
| 2018/0126876 A1 | 5/2018 | Takamatsu et al. | |
| 2018/0244174 A1* | 8/2018 | Tan | B60N 2/22 |
| 2019/0241099 A1 | 8/2019 | Sugiyama et al. | |

FOREIGN PATENT DOCUMENTS

| | | |
|---|---|---|
| JP | 860-128827 U | 8/1985 |
| JP | 862-101542 A | 5/1987 |
| JP | 862-101543 A | 5/1987 |
| JP | 862-101544 A | 5/1987 |
| JP | H01-240330 A | 9/1989 |
| JP | 2001-058552 A | 3/2001 |
| JP | 2005-088851 A | 4/2005 |
| JP | 2005-335586 A | 12/2005 |
| JP | 2005-335616 A | 12/2005 |
| JP | 2006-044409 A | 2/2006 |
| JP | 2011-131698 A | 7/2011 |
| JP | 2011-131699 A | 7/2011 |
| JP | 2012-101566 A | 5/2012 |
| JP | 2015-118438 A | 6/2015 |
| JP | 2015-133050 A | 7/2015 |
| JP | 2016-043813 A | 4/2016 |
| JP | 2016-64773 A | 4/2016 |
| JP | 2016078530 A | 5/2016 |
| JP | 2016-132298 A | 7/2016 |
| JP | 2016-168972 A | 9/2016 |
| JP | 2016-190560 A | 11/2016 |
| JP | 2016-191686 A | 11/2016 |
| JP | 2016-196225 A | 11/2016 |
| JP | 2016-199125 A | 12/2016 |
| JP | 2016-222073 A | 12/2016 |
| JP | 2017-1520 A | 1/2017 |
| JP | 2017-024652 A | 2/2017 |
| JP | 2017-024653 A | 2/2017 |
| JP | 2017-030445 A | 2/2017 |
| JP | 2017-036003 A | 2/2017 |
| JP | 2017-39400 A | 2/2017 |
| JP | 2017-039468 A | 2/2017 |
| JP | 2017-047694 A | 3/2017 |
| JP | 2017064787 A | 4/2017 |
| WO | 2015/011866 A1 | 1/2015 |
| WO | 2016/068273 A1 | 5/2016 |
| WO | 2016/199379 A1 | 12/2016 |

OTHER PUBLICATIONS

Oct. 1, 2019 International Preliminary Report on Patentability issued in International Patent Application No. PCT/JP2017/034845.
May 11, 2021 Office Action issued in Japanese Patent Application No. 2017-064778.
May 11, 2021 Office Action issued in Japanese Patent Application No. 2017-064787.
May 11, 2021 Office Action issued in Japanese Patent Application No. 2017-064801.
Feb. 14, 2022 Office Action issued in Chinese Patent Application No. 201780089162.9.
Feb. 15, 2022 Office Action issued in Japanese Patent Application No. 2017-064778.
Feb. 15, 2022 Office Action issued in Japanese Patent Application No. 2017-064787.
Feb. 21, 2023 Notice for Reasons for Refusal issued in Japanese Patent Application No. 2022-079879.
May 9, 2023 Office Action issued in Japanese Patent Application No. 2022-041150.
Feb. 21, 2023 Office Action issued in Japanese Patent Application No. 2022-079880.
Aug. 22, 2023 Office Action issued in Japanese Patent Application No. 2022-079880.

\* cited by examiner

VEHICLE CONTROL SYSTEM

This is a Continuation of U.S. application Ser. No. 17/940,586, filed on Sep. 8, 2022, which is a Continuation of U.S. application Ser. No. 16/499,017, filed on Sep. 27, 2019, which is a National Stage Application of International Patent Application No. PCT/JP2017/034845, filed on Sep. 27, 2017, which claims priority to three Japanese Applications Nos. 2017-064778, 2017-064801, and 2017-064787, all three of which were filed on Mar. 29, 2017, and the entire disclosures of each of which are hereby incorporated by reference in their entirety.

TECHNICAL FIELD

The present invention relates to a vehicle control system.

BACKGROUND ART

In recent years, techniques related to autonomous driving have been developed in which vehicles such as automobiles keep track of surrounding situations to maintain or change driving lanes, avoid obstacles, and stop or travel according to the situations. There are proposed various techniques related to such autonomous driving. For example, there is a known technique that allows seat arrangements where the seat on which a driver is seated is set to be in a direction opposite to the vehicle traveling direction (backward) during autonomous driving so that an occupant seated on a back seat of the vehicle and the driver are seated face to face (for example, see PTL 1).

CITATION LIST

Patent Literature

PTL 1: JP 2017-039468 A

SUMMARY OF INVENTION

Technical Problem

In a vehicle where autonomous driving is possible, there may be a case where autonomous driving is switched to driving by the driver depending on the situation. At this time, the condition of the seat where the driver is seated needs to return from a condition during autonomous driving to a condition appropriate for manual driving. However, for example, the time to start manual driving may not correspond to the time required for the seat to return to a condition appropriate for manual driving. Furthermore, even if the seat has returned to the condition appropriate for manual driving, the driver may not be able to start manual driving due to the driver's condition. Therefore, improvement of safety has been desired.

The present invention has been made in view of the above circumstances, and an object of the present invention is to provide a vehicle control system capable of improving safety when autonomous driving is switched to manual driving.

Solution to Problem

In order to solve the above problems, according to one embodiment, there is provided a vehicle control system including:

a driving controller that switches between autonomous driving and manual driving of a vehicle;
a seat whose form is changed between a form during autonomous driving and a form during manual driving that are different from each other; and
a seat controller that controls motion of the seat when a form of the seat is changed,
wherein, if the seat is in a form during autonomous driving, the driving controller does not switch autonomous driving to manual driving when controlling the vehicle.

According to another feature, the seat controller controls a motion amount of the seat in motion when a form of the seat is changed from a form during manual driving to a form during autonomous driving.

According to another feature, the seat controller controls motion speed of the seat when a form of the seat is changed.

According to another feature, the seat controller controls speed of the seat in motion and extends required time for the motion when a form of the seat is changed from a form during autonomous driving to a form during manual driving.

According to another feature,
the driving controller controls the vehicle based on (i) a forced switching mode in which switching between autonomous driving and manual driving is forcibly performed and (ii) a voluntary switching mode in which switching between autonomous driving and manual driving is performed according to selection by a driver, and
the seat controller controls the speed of the seat in motion separately in (i) the forced switching mode and in (ii) the voluntary switching mode.

According to another feature, the vehicle control system includes:
a driver condition detector that detects condition of a driver, and
depending on a detection result of driver's condition detected by the driver condition detector, the driving controller controls the vehicle whether or not to switch autonomous driving to manual driving.

According to another feature, the driver condition detector detects whether or not the driver is seated on the seat.

According to another feature, the driver condition detector detects a health condition of the driver.

According to another feature, in the vehicle control system,
the vehicle includes the seat including multiple seats, and
when the driving controller switches autonomous driving to manual driving of the vehicle, the seat controller controls a motion of a driver's seat and a non-driver's seat among the multiple seats, a form of each of the driver's seat and the non-driver's seat being changed from a form during autonomous driving to a form during manual driving.

According to another feature, in the vehicle control system, the seat controller preferentially controls the driver's seat among the multiple seats.

According to another feature,
the driving controller switches between autonomous driving and manual driving of a vehicle,
the seat is provided in the vehicle, and
the seat includes a protector and a protector controller that controls a motion of the protector, the protector protecting an occupant seated on the seat in a situation where the occupant is required to be protected.

According to another feature, the driving controller switches between autonomous driving and manual driving of a vehicle,
a form of the seat is changed between multiple forms,
the seat controller controls a motion of the seat when a form of the seat is changed, and
the multiple forms of the seat include a form suitable for manual driving and a form not suitable for manual driving.

Advantageous Effects of Invention

When the seat is in the form during autonomous driving, the driving controller can control the vehicle such that autonomous driving does not switch to manual driving. Therefore, it is possible to prevent autonomous driving from switching to manual driving before the form of the seat is changed from the form during autonomous driving to the form during manual driving. Therefore, it is possible to improve safety when autonomous driving is switched to manual driving.

According to another feature, the motion amount when the form of the seat is changed from the form during manual driving to the form during autonomous driving can be limited in consideration of the time required to switch autonomous driving to manual driving. Therefore, the timing of switching autonomous driving to manual driving can be adjusted to the timing of changing the form of the seat from the form during autonomous driving to the form during manual driving. Therefore, it is possible to improve safety when autonomous driving is switched to manual driving.

According to another feature, because the seat controller controls the motion speed when changing the form of the seat, the timing of motion for changing the form of the seat can be adjusted to the timing of switching between autonomous driving and manual driving. Therefore, it is possible to improve safety in switching between autonomous driving and manual driving.

According to another feature, the motion of the seat can be delayed when the form is changed and adjusted to the timing of switching autonomous driving to manual driving, and the occupant has enough time to prepare for manual driving. Therefore, it is possible to improve safety when autonomous driving is switched to manual driving.

According to another feature, the seat controller controls the motion speed of the seat separately in the forced switching mode and in the voluntary switching mode. Therefore, the seat can be operated at a speed suitable for each mode. Therefore, it is possible to improve safety when autonomous driving is switched to manual driving.

According to another feature, if autonomous driving is not desirably switched to manual driving as a detection result of driver's condition, the vehicle can be controlled so that autonomous driving is not switched to manual driving. Therefore, it is possible to improve safety when autonomous driving is switched to manual driving.

According to another feature, because the driver condition detector detects whether or not the driver is seated on the seat, autonomous driving is prevented from switching to manual driving when the driver is not seated in the seat (driver's seat). Therefore, it is possible to improve safety when autonomous driving is switched to manual driving.

According to another feature, because the driver condition detector detects a health condition of the driver, autonomous driving is prevented from switching to manual driving when the driver is in a health condition in which driving is not possible. Therefore, it is possible to improve safety when autonomous driving is switched to manual driving.

According to another feature, when the driving controller switches autonomous driving of the vehicle to manual driving, the seat controller can control the motion so that, in addition to the driver's seat, the form of other seat(s) are also changed from the form during autonomous driving to the form during manual driving. Therefore, forms of multiple seats can be changed simultaneously from the form during autonomous driving to the form during manual driving.

According to another feature, it is possible to change the form of the driver's seat to a form during manual driving earlier than the other seats, and to improve safety when autonomous driving is switched to manual driving.

According to another feature, the seat includes a protector which protects the occupant in a situation where protection of the occupant seated on the seat is required, and a protector controller which controls the motion of the protector. Therefore, in a situation where the occupant seated on the seat needs to be protected, the protector controller can control the motion of the protector and protect the occupant. Therefore, it is possible to ensure the safety of the occupant when the seat in the form during autonomous driving is returned to be in the form suitable for manual driving.

According to another feature, the multiple forms of the seat include a form suitable for manual driving and a form not suitable for manual driving. Therefore, the safety of the occupant who drives the vehicle can be improved when the seat is in the form suitable for manual driving, and the comfort of the occupant can be improved in the form not suitable for manual driving where the occupant can get any posture.

DESCRIPTION OF EMBODIMENTS

Hereinafter, embodiments of the present invention will be described with reference to the drawings. Although a variety of limitations that are technically favorable for carrying out the present invention are put on the following embodiments, the scope of the present invention is not limited to the following embodiments or illustrated examples.

Figure 1:
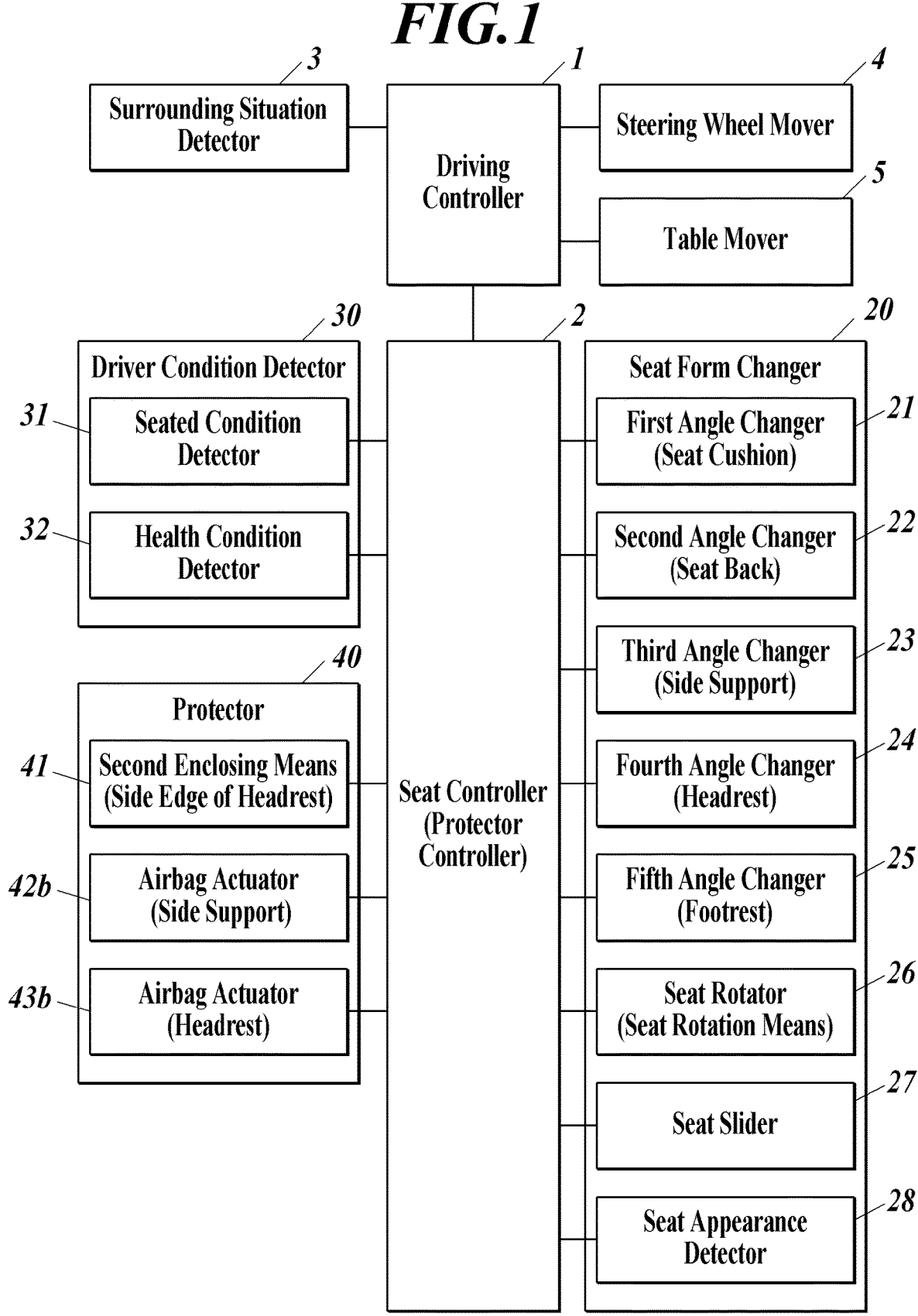
FIG. 1 is a block diagram showing a schematic configuration of a vehicle control system.

FIG. 1 shows a schematic configuration of a vehicle control system.

The vehicle control system of the present embodiment includes an driving controller 1 that switches between autonomous driving and manual driving of a vehicle V, a seat 10 that can be changed to different forms between autonomous driving and during manual driving, a seat controller 2 that controls the motion of the seat 10 when the form is changed, a seat form changer 20 that changes the form of the seat 10 based on the control by the seat controller 2, a driver condition detector 30, a protector 40, each of which is connected to an in-vehicle network. The vehicle V includes multiple seats 10.

[Driving Controller]

The driving controller 1 includes a microcomputer including a central processing unit (CPU), a read only memory (ROM), a random access memory (RAM), and the like. The driving controller 1 is connected to various devices such as a brake lamp, an auxiliary device (for example, a direction indicator light, a headlight, a wiper device, and the like), and an actuator.

The driving controller 1 loads a program stored in the ROM in advance into the RAM and executes it on the CPU, to control operation of various devices and to control the autonomous driving. The driving controller 1 may be composed of a plurality of electronic control units.

Specifically, the driving controller 1 controls switching between autonomous driving and manual driving by an occupant. During the autonomous driving, the driving controller 1 controls the vehicle V by judging the surrounding situation(s) of the vehicle V and the condition(s) of the vehicle V. In order to drive the vehicle V automatically during the autonomous driving, the driving controller 1 judges the surrounding situations of the vehicle V based on information obtained from the surrounding situation detector 3 such as various sensors and a camera for capturing the surrounding situations. Then, depending on the judging result, an autonomous driving control process is performed in which an actuator controls an accelerator, brake, steering angle, and the like. In the autonomous driving control process, the driving controller 1 generates a driving plan along a preset target route on the basis of surrounding situations of the vehicle V and map information, and controls driving so that the vehicle V is driven autonomously according to the generated driving plan.

For example, the driving controller 1 can automatically start an autonomous driving control process according to the behavior of the vehicle V and the surrounding situations during manual driving by the occupant, so as to assist the occupant in driving the vehicle V. In this case, the driving controller 1 outputs information indicating a start of the autonomous driving control process. In a case where manual driving by the occupant is switched to autonomous driving by the autonomous driving control process according to the occupant's commands, the driving controller 1 outputs predetermined information indicating that the driving leadership is transferred, in other words, indicating the start of the autonomous driving control process.

Furthermore, the driving controller 1 may automatically terminate (release) the autonomous driving control process according to the behavior of the vehicle V and the surrounding situations during the execution of the autonomous driving control process, and prompt the occupant to drive the vehicle V manually. In this case, the driving controller 1 outputs information indicating termination of the autonomous driving control process in order to prompt the occupant to perform manual driving of the vehicle V. Furthermore, in a case where the occupant instructs the driving controller 1 to switch autonomous driving with the autonomous driving control process to manual driving by the occupant, the driving controller 1 outputs predetermined information which indicates that the driving leadership is transferred, that is, information which indicates the termination of the autonomous driving control process.

The driving controller 1 may include a communication device which exchanges information such as the surrounding situations between the vehicle V and the outside of the vehicle V. An example of the communication device is one that receives road conditions by road-to-vehicle communication such as a wireless communication device using DSRC (Dedicated Short Range Communications) narrow-range communication.

Furthermore, information indicating the surrounding situations which are the road conditions received with road-to-vehicle communication includes the curvature of the traveling lane, the shape and condition of the lane and road such as the road surface cant, the positional relationship of the vehicle V with respect to the lane, information indicating the positional relationship of other vehicles, the traffic volume around the vehicle, and the like. Furthermore, the driving controller 1 may include a navigation system as an example of a device for obtaining a surrounding situations.

The surrounding situation detector 3 includes multiple kinds of sensors, surrounding photography cameras, and the like, and detects the surrounding situations of the vehicle V so that the driving controller 1 performs the autonomous driving. The surrounding situation detector 3 detects, for example, imaging information from a surrounding photographing camera, obstacle information based on a radar, obstacle information based on a LIDER (Laser Imaging Detection and Ranging), and the like as the surrounding situations of the vehicle V. The surrounding situation includes, for example, the position of the white line of the traveling lane relative to the vehicle V, the position of the lane center, the road width, the road shape, the condition of an obstacle around the vehicle V, and the like. The road shape includes, for example, the curvature of the traveling lane, a change in slope of the road effective for prospective estimation by the sensor, and meanders. The condition of the obstacle around the vehicle V includes, for example, information for distinguishing a fixed obstacle and a moving obstacle, the position of the obstacle with respect to the vehicle V, the motion direction of the obstacle with respect to the vehicle V, the relative speed of the obstacle with respect to the vehicle V, and the like.

[Seat Controller and Seat]

The seat controller 2 is configured to change the position, direction, and appearance (that is, form) of the seat 10 provided in the vehicle V with respect to the vehicle V, and includes a microcomputer including a CPU (Central Processing Unit), a ROM (Read Only Memory), a RAM (Random Access Memory), and the like. In addition to the driving controller 1 and the seat controller 2, the vehicle control system according to the present embodiment has various means necessary for changing the form of the seat 10, such as a storage for storing various kinds of information and programs, an input means for transmitting the occupant's intention to the system, and an output means for transmitting various kinds of information to the occupant.

Furthermore, the seat controller 2 is connected to the driving controller 1 and can control the form of the seat 10 in coordination with the driving controller 1 controlling driving of the vehicle V. However, the present invention is not limited thereto, and the driving controller 1 and the seat controller 2 may be a single integrated controller.

Figure 3A:
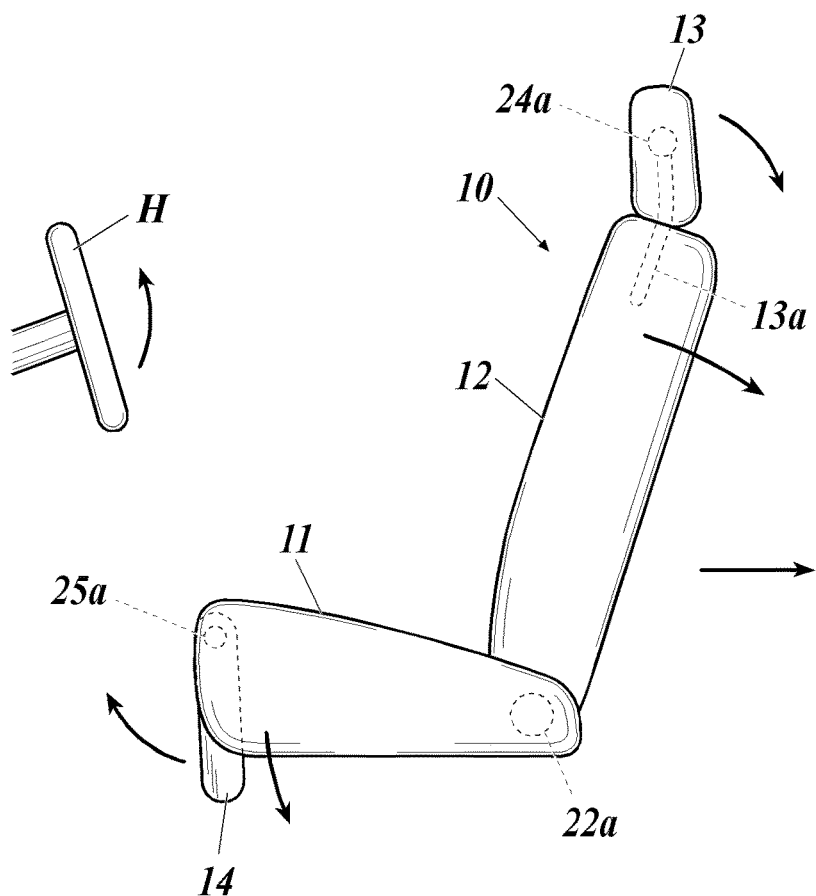
FIG. 3A is an illustration to explain an example of changing the form of seat.

As shown in FIG. 3A, the seat 10 includes a seat cushion 11 which holds buttocks of the occupant, a seat back 12 which has a lower edge supported by the seat cushion 11, a headrest 13 which is provided at an upper edge of the seat back 12 and supports the head of the occupant, and a footrest 14 which is provided at the front edge of the seat cushion 11 and supports the foot of the occupant.

The seat cushion 11 and the seat back 12 each have a frame (not shown) which is a framework of the seat cushion 11 and the seat back 12. Furthermore, the seat cushion 11 and the seat back 12 respectively have side supports 11a and side supports 12a each having an obliquely convex shape and holding the occupant. At the left and right edges, the seat cushion 11 has the respective side supports 11a, and at the left and right edges, the seat back 12 has the respective side supports 12a.

In the seat cushion 11, the above-described frame is supported on the floor of the vehicle body by a support mechanism (not shown).

Figure 3B:
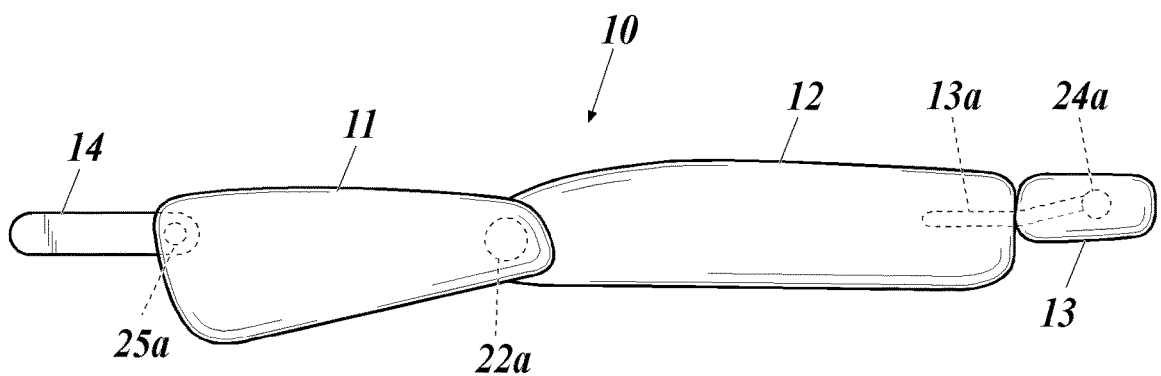
FIG. 3B is an illustration to explain an example of changing the form of seat.

As shown in FIGS. 3A and 3B, the headrest 13 includes a pillar 13a assembled to the frame of the seat back 12.

The footrest 14 has a frame (not shown) which is a framework of the footrest 14.

The seat form changer 20 includes a support mechanism and an actuator for changing the form of the seat 10 with respect to the vehicle V, so as to be able to change the seat arrangement of the seat 10. In the present embodiment, the seats 10 are arranged in two rows in each of the vehicle width direction and in the vehicle longitudinal direction, and the form of the seats 10 can be individually changed by the seat controller 2 and the seat form changer 20.

Each of the multiple seats 10 can be changed to multiple forms, and can be changed to multiple forms using the seat controller 2 and the seat form changer 20.

The multiple forms of each of the seat 10 include a form suitable for manual driving and a form not suitable for manual driving.

In the present embodiment, at the timing when the driving controller 1 switches autonomous driving to manual driving, the seat controller 2 controls the seat form changer 20 so that a change to a seat arrangement for manual driving (a form suitable for manual driving) is made. On the other hand, at the timing when the driving controller 1 switches manual driving to autonomous driving, the seat controller 2 controls the seat form changer 20 so that a change to a seat arrangement for an autonomous driving (a form not suitable for manual driving) is made. The form not suitable for manual driving is a form of the seat 10 changed by the seat form changer 20 which operates according to the control by the seat controller 2, when the driving controller 1 switches manual driving of the vehicle V to autonomous driving thereof.

The form of the seat 10 changed to the form suitable for manual driving can be adjusted by manual operation by the occupant, that is, the occupant can finely adjust the seat 10 depending on the physical characteristics of the occupant.

There are multiple patterns (forms) of the seat 10 which is not suitable for manual driving, and the motion of the seat 10 is controlled by the seat controller 2 so as to be in a form corresponding to a pattern selected by the occupant among the multiple patterns. That is, although not shown in the drawings, the occupant may select one of the multiple forms (multiple patterns) of the seat 10 for autonomous driving displayed on a display for a navigation system as above, for example. A button for selecting a form from the multiple forms may be arranged in the interior of the vehicle V. In other words, in the vehicle control system are stored multiple options (multiple patterns) in advance, and is incorporated a selection means (input means) configured to select the form of seat 10. The occupant can select the form of the seat 10 in any pattern from the multiple options (multiple patterns).

Then, the seat controller 2 operates the seat form changer 20 so as to change the form of the seat 10 depending on the selection made by the occupant using the selection means.

In order to make it possible to change the form as described above, the seat 10 includes a first angle changer 21, a second angle changer 22, a third angle changer 23, a fourth angle changer 24, a fifth angle changer 25, a seat rotator 26, a seat slider 27, and a seat appearance detector 28 (see FIG. 1).

The first angle changer 21 can be controlled by the seat controller 2 to change the angle of the seat cushion 11, and is incorporated in the support mechanism described above. That is, the support mechanism for supporting the seat cushion 11 is configured to be able to change the angle of the seat cushion 11.

The first angle changer 21 can change the angle of the seat cushion 11 from an angle suitable for manual driving to an angle in a flat condition. That is, the seat cushion 11 in a condition where the front edge is positioned above the rear edge as shown in FIG. 3A can be changed to be in a flat condition as shown in FIG. 3B.

The second angle changer 22 can be controlled by the seat controller 2 to change the angle of the seat back 12, and includes the above-described frame of the seat back 12, a rotating shaft 22a which allows the seat back 12 to rotate with respect to the seat cushion 11, and an actuator (not shown) which is driven to rotate the rotating shaft 22a.

The second angle changer 22 can change the angle of the seat back 12 from an angle suitable for manual driving to an angle in a flat condition. That is, the seat back 12 in an inclined condition as shown in FIG. 3A can be changed to be in a flat condition as shown in FIG. 3B.

The third angle changer 23 can be controlled by the seat controller 2 to change the angles of the side supports 11a and 12a of the seat cushion 11 and the seat back 12, and includes a movable mechanism that opens the cushion material forming the side supports 11a and 12a toward the left and right. That is, the movable mechanism is built in the seat cushion 11 and the seat back 12.

Figure 4A:
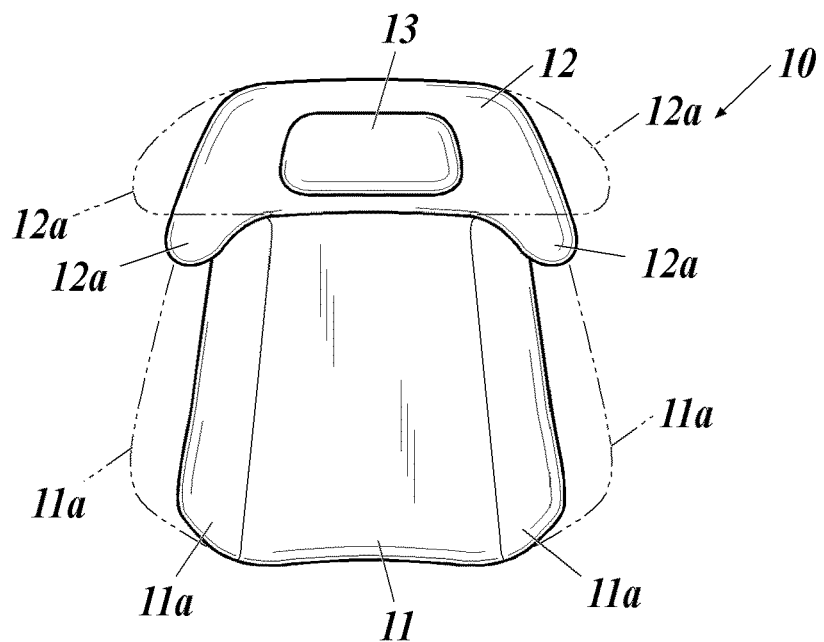
FIG. 4A is an illustration to explain an example of changing the form of seat.
Figure 4B:
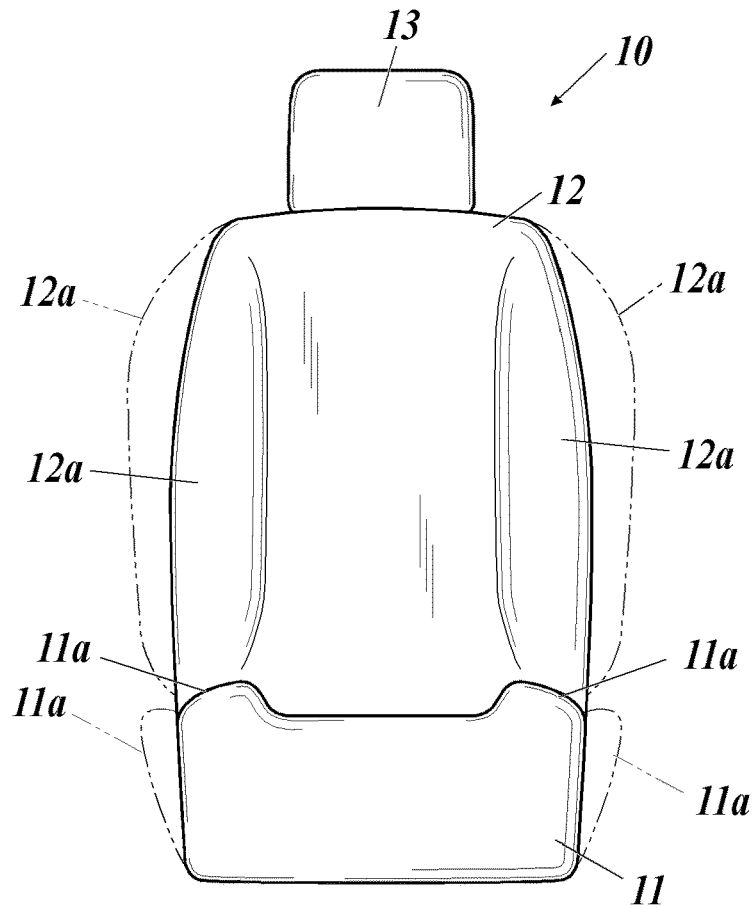
FIG. 4B is an illustration to explain an example of changing the form of seat.

The third angle changer 23 can change the each of the angles of the side supports 11a and 12a from an angle suitable for manual driving to an angle in a flat condition. That is, the seat cushion 11 and the seat back 12 in a condition where the side supports 11a and 12a, each having an obliquely convex shape as shown by the solid lines in FIGS. 4A and 4B, may be changed to be in a condition where the side supports 11a and 12a are flat as shown by the two-dot chain lines in FIGS. 4A and 4B.

The fourth angle changer 24 can be controlled by the seat controller 2 to change the angle of the headrest 13, and includes the above-described pillar 13a of the headrest 13, a rotating shaft 24a which allows the headrest 13 to rotate with respect to the seat back 12, and an actuator (not shown) which is driven to rotate the rotating shaft 24a.

When the seat back 12 is in the flat condition, the third angle changer 24 can change the angle of the headrest 13 until it becomes a flat condition. That is, the headrest 13 in an angle suitable for supporting the head of the occupant as shown in FIG. 3A can be changed to be in a flat condition as shown in FIG. 3B.

The fifth angle changer 25 can be controlled by the seat controller 2 to change the angle of the footrest 14, and includes the above-described frame of the footrest 14, a rotating shaft 25a which allows the footrest 14 to rotate with respect to the seat cushion 11, and an actuator (not shown) which is driven to rotate the rotating shaft 25*a*.

The fifth angle changer 25 can change the angle of the footrest 14 from an angle suitable for manual driving to an angle in a flat condition. That is, the footrest 14 stored in the front edge of the seat cushion 11 as shown in FIG. 3A can be changed to be in a flat condition as shown in FIG. 3B.

The seat rotator 26 can be controlled by the seat controller 2 and rotates the seat cushion 11 (and thus the seat 10 as a whole), and is incorporated in the support mechanism described above. That is, the support mechanism for supporting the seat cushion 11 is configured to be able to change the angle of the seat cushion 11.

The seat rotator 26 can rotate the seat cushion 11 from a position suitable for manual driving to a position where the seat faces completely backward.

The seat slider 27 can be controlled by the seat controller 2, slides the seat cushion 11 (and thus the seat 10 as a whole) in the front-rear direction and the left-right direction, and is incorporated in the above-described support mechanism. That is, the support mechanism for supporting the seat cushion 11 is configured to be able to change the position of the seat cushion 11 in the front-rear direction and the left-right direction.

The seat slider 27 can slide the seat cushion 11 from a position suitable for manual driving to a position not suitable for manual driving.

The seat controller 2 can control the first to fifth angle changers 21 to 25, the seat rotator 26, and the seat slider 27 simultaneously, not to mention separately.

The seat appearance detector 28 includes multiple sensors (not shown) which detect the position of each part of the seat 10. The seat controller 2 can calculate and derive the appearance, position, and orientation of the seat 10 based on detection signals from the multiple sensors. That is, after the form of the seat 10 is changed, it is possible to grasp the condition of the seat 10 using the seat appearance detector 28.

As shown in FIG. 3A, the driving controller 1 can move a steering wheel H for driving the vehicle V up and down. The vehicle V includes a steering wheel mover 4 which is a movable mechanism for moving the steering wheel H up and down (see FIG. 1). The steering wheel H which moves up and down allows not only the position of the steering wheel H to be adjusted but also the space inside the vehicle to be expanded during autonomous driving.

[Switching from Manual Driving to Autonomous Driving]

The driving controller 1 performs control based on a forced switching mode in which switching is forcibly performed between autonomous driving and manual driving, and a voluntary switching mode in which switching is performed according to selection by a driver between autonomous driving and manual driving. That is, manual driving may be switched to automatic driving forcibly or voluntarily.

Examples of cases where the switching is voluntarily performed include a case where an abnormality has occurred in the occupant's health condition, and a case where a timing for switching manual driving to autonomous driving has been scheduled in advance.

When the vehicle V autonomously switches manual driving to autonomous driving, the occupant selects any form of the seat 10 by the above-described selection means. The seat controller 2 controls the motion of the seat form changer 20 to change the form of the seat 10 according to the selection by the occupant.

The first to fifth angle changers 21 to 25 and the seat rotator 26 in the seat form changer 20 appropriately operate so that the seat 10 is in the form selected by the occupant.

Options (patterns) that can be selected by the occupant are not particularly limited, and various patterns may be set in advance, including a form in which the seat 10 is flat as shown in FIG. 3B.

Other options include various patterns such as a sleep pattern suitable for sleeping, a watching pattern suitable for watching videos displayed on the display, a desk work pattern suitable for work and writing, and the like.

The seat back 12 in the condition in the sleep pattern is inclined slightly upward compared to that of the flat condition shown in FIG. 3B.

In the watching pattern, the entire seat 10 changes its direction to face the display, and the angles of the seat cushion 11 and the seat back 12 are changed.

In the desk work pattern, the side supports 11*a* and 12*a* are each in an open condition, so as to have an angle changed to a preferred angle for the occupant being seated to perform desk work. Furthermore, although not shown, a table is arranged in front of the occupant in the condition in order that the occupant is easily seated on the seat 10 and work.

The table is provided as an auxiliary function unit which assists the occupant seated on the seat 10 and, in the present embodiment, incorporated in the interior of the vicinity of the seat 10. The table can be moved by a table mover 5 which is a movable mechanism for moving the table.

The table is incorporated in the interior of the vicinity of the seat 10 in the present embodiment, but is not limited thereto, and may be incorporated in a storage portion (not shown) formed in the seat 10 itself.

The auxiliary function unit such as the above-described table may have any function for assisting the occupant's work. For example, a drink holder may be provided as the auxiliary function unit which moves to a position where the occupant easily reaches by hand in the watching pattern.

After the seat 10 is changed to be in a form selected by the occupant, the angle of each part such as the seat cushion 11 and the seat back 12 and the direction of the seat 10 can be finely adjusted.

[Switching Autonomous Driving to Manual Driving]

As described above, the driving controller 1 performs control based on the forced switching mode in which switching is forcibly performed between autonomous driving and manual driving, and the voluntary switching mode in which switching is performed between autonomous driving and manual driving depending on the selection by the driver.

The occupant may optionally switch autonomous driving to manual driving of the vehicle V. That is, when the occupant determines that manual driving is necessary, the occupant switches autonomous driving to manual driving.

The forced switching may be performed, for example, when the vehicle V on a highway moves to an ordinary road, or when the vehicle V is approaching a road having a complicated shape. However, when autonomous driving is forcibly switched to manual driving, the driver may not be seated on the seat 10 or the driver's health condition may be abnormal, for example. In such a case, it is not preferable to forcibly switch to manual driving.

Therefore, when the seat 10 is in a form during autonomous driving, the driving controller 1 can control the vehicle V so as not to switch autonomous driving to manual driving.

The vehicle control system of the present embodiment includes a driver condition detector 30 for detecting a driver's condition. Depending on the detection result of driver's condition by the driver condition detector 30, the driving controller 1 can control the vehicle V whether or not to switch autonomous driving to manual driving.

More specifically, as shown in FIG. 1, the driver condition detector 30 includes a seated condition detector 31 that detects whether or not the driver is seated on the seat 10.

The seated condition detector 31 is a sensor (for example, a pressure sensor) which is incorporated at least in the seat 10 as the driver's seat and detects that the occupant is seated.

If it is confirmed that the occupant has been seated according to the seated condition detector 31, the driving controller 1 can switch autonomous driving of the vehicle V to manual driving. If it cannot be confirmed that the driver has been seated, the driving controller 1 continues autonomous driving without switching the autonomous driving to the manual driving.

In the present embodiment, a pressure sensor is used as the seated condition detector 31, but the present invention is not limited thereto, and the seated condition of the occupant may be confirmed by photographing with a camera.

Furthermore, as shown in FIG. 1, the driver condition detector 30 has a health condition detector 32 which detects the health condition of the driver.

As the health condition detector 32, a sensor that is incorporated in at least the seat 10 as the driver's seat and detects the health condition of the occupant is used. Such a sensor may be, for example, a biological sensor such as a blood pressure sensor or a pulse sensor.

If it can be confirmed using the health condition detector 32 that there is no problem with the occupant's health condition, the driving controller 1 can switch autonomous driving of the vehicle V to manual driving. If it is confirmed that there is a problem with the driver's health condition, the driving controller 1 continues autonomous driving without switching the autonomous driving to the manual driving.

In the present embodiment, a biological sensor is used as the health condition detector 32, but the present invention is not limited thereto, and the health condition of the occupant may be confirmed by images taken with a camera. For example, a pupil is confirmed, or a condition in which the hand is not placed on the steering wheel H is confirmed.

Also, if the sensor and camera are used together, it can also be determined whether or not the occupant is just asleep. That is, a condition in which there is no problem in the health condition but the eyes are not open is determined to be a doze.

Furthermore, a microphone which catches a driver's voice may be used with the biological sensor to confirm whether or not the driver is conscious. That is, if the driver is urged to speak but the driver's voice cannot be detected, it is determined that the driver is unconscious.

Furthermore, an alcohol sensor may be used. If the alcohol sensor detects alcohol from the driver's expiration, autonomous driving is not switched to manual driving. Depending on the cases, control may be made so that the vehicle V is parked at a place where parking is allowed, and that the vehicle cannot start until alcohol is no longer detected from the driver's expiration. In such cases, the vehicle V may be allowed to be started if the driver is changed to an occupant from whom alcohol is not detected.

Figure 2:
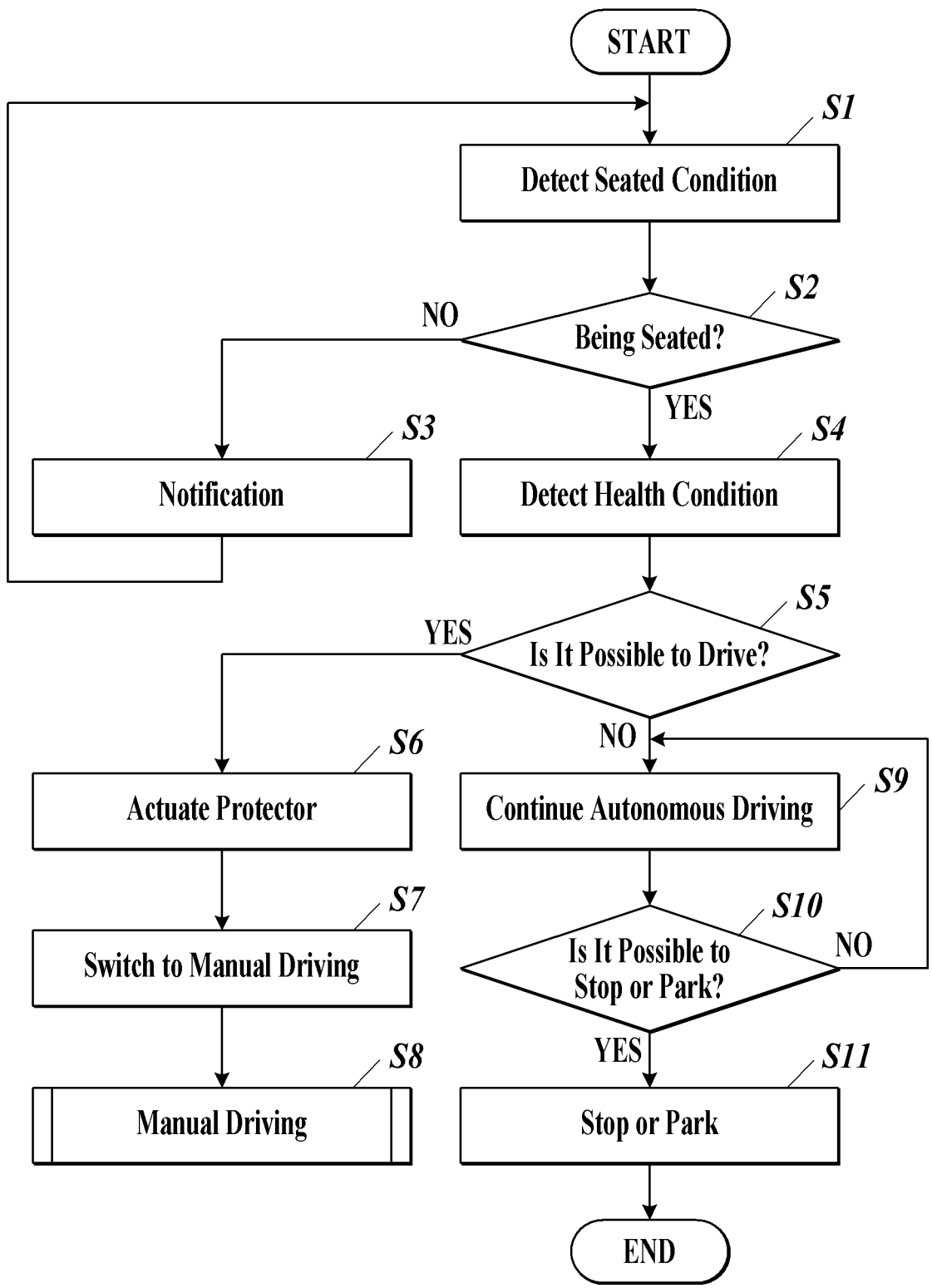
FIG. 2 is a flowchart when switching autonomous driving to manual driving.

FIG. 2 is a flowchart showing the case where autonomous driving is switched to manual driving.

As shown in this flowchart, when autonomous driving is switched to manual driving, first, the seated condition detector 31 detects the seated condition of the occupant in the seat 10 as the driver's seat (step S1).

If it cannot be confirmed in step S2 that the occupant is seated, the driving controller 1 notifies the occupant in the vehicle in step S3 and prompt the occupant to sit in the seat 10.

If it can be confirmed in step S2 that the occupant is seated, the driving controller 1 detects health condition of the occupant using the health condition detector 32 (step S4).

If it is confirmed in step S5 that there is no problem with the health condition of the occupant, the seat controller 2 activates a protector described later to protect the occupant (step S6).

Subsequently, the driving controller 1 switches the autonomous driving of the vehicle V to manual driving (step S7). At this time, the driving operation of the vehicle V is performed by the occupant seated on the seat 10 of the driver's seat. Thereafter, manual driving is continued (step S8).

If it is confirmed in step S5 that there is a problem with the health condition of the occupant, the driving controller 1 continues autonomous driving (Step S9).

If autonomous driving is continued, the surrounding situation detector 3 detects, for safety, a place where the vehicle V can be parked or stopped (step S10). If a place where the vehicle V can be parked or stopped cannot be found, autonomous driving is continued. If a place where parking or stopping is possible is found, the vehicle V is stopped or parked at the place (step S11).

Switching autonomous driving to manual driving is performed as described above.

The vehicle V includes multiple seats 10 as described above. When the driving controller 1 switches autonomous driving of the vehicle V to manual driving, the seat controller 2 can control, as well as the seat 10 for the driver, the other seats 10 (non-driver's seat(s)) in the form during autonomous driving to be in a form during manual driving.

Due to the space in the vehicle, it may not be preferable to operate all the seats 10 in the car at the same time. Therefore, the seat controller 2 preferentially controls the motion of the seat 10 for the driver among the multiple seats 10.

Also, if the occupant is in a relaxed condition during autonomous driving and the seat 10 is also in a form suitable for the occupant's relaxing condition, the seat 10 may not be returned to a position suitable for manual driving by the time when manual driving should be started.

Therefore, if the seat 10 is in the form of autonomous driving and cannot be returned to a position suitable for manual driving by the time when manual driving should be started, the driving controller 1 can perform control so that autonomous driving of the vehicle V is not switched to manual driving.

Furthermore, in order to prevent the seat 10 from not returning to the position suitable for manual driving by the time to start manual driving, the seat controller 2 controls a motion amount of the seat 10 during motion when the form changes from the form during manual driving to the form during autonomous driving.

That is, if the seat 10 is facing directly behind and is in a flat condition when manual driving is switched to autonomous driving, for example, the seat 10 may take time for returning to the position suitable for manual driving and may not be ready by the start of manual driving. Therefore, if the motion amount of the seat 10 is limited during change from the form during manual driving to the form during autonomous driving, it is possible to prevent the seat 10 from not returning by the time to start manual driving.

The seat controller 2 controls the motion speed of the seat 10 during change of the form. That is, under the control by the seat controller 2, it is possible to increase or decrease the motion speed of the seat 10 during change from the form during autonomous driving to the form during manual driving, and during change from the form during manual driving to the form during autonomous driving.

As a result, when manual driving is switched to autonomous driving, it is possible to prevent the seat 10 from not finishing the form change by the time to start manual driving. Furthermore, the motion speed during the form change of the seat 10 can be changed not only when manual driving is switched to autonomous driving but also in other cases.

Furthermore, the seat controller 2 extends the required time by controlling the motion speed of the seat 10 in motion when the form is changed from the form during autonomous driving to the form during manual driving. That is, the seat controller 2 controls the motion of the seat 10 to be delayed so that the occupant in a relaxed condition has enough time to deal with manual driving.

As a result, the motion of the seat 10 can be delayed when the form is changed and adjusted to the timing of switching autonomous driving to manual driving, and the occupant has enough time to prepare for manual driving.

Furthermore, as described above, the driving controller 1 performs control based on a forced switching mode in which switching is forcibly performed between autonomous driving and manual driving, and a voluntary switching mode in which switching is performed between autonomous driving and manual driving according to selection by a driver. The seat controller 2 controls the motion speed of the seat 10 separately in the forced switching mode and in the voluntary switching mode.

As a result, it is possible to prevent the seat 10 from not finishing the form change by the time to start manual driving when manual driving is switched to autonomous driving. Furthermore, the seat 10 can be operated at a speed suitable for each mode.

As described above, the form of the seat 10 can be changed from the form during autonomous driving to the form during manual driving, and autonomous driving of the vehicle V can be switched to manual driving.

The timing for switching autonomous driving to manual driving is, in other words, the timing when the leadership for driving the vehicle V is transferred from a computer to a human. Therefore, it is desirable to ensure the safety of the occupant. Furthermore, it goes without saying that safety of the occupant has to be ensured not only at the timing for switching autonomous driving to manual driving, but also during autonomous driving. The occupant protection system for ensuring safety of the occupant is described below.

[Occupant Protection System]

As shown in FIGS. 1 and 5A to 7, the seat 10 includes a protector which protects the occupant in a situation where the occupant seated on the seat 10 is required to be protected and a protector controller which controls the motion of the protector.

Because the protector controller controls the motion of the protector incorporated in the seat 10, the seat controller 2 described above also functions as the protector controller.

Figure 5A:
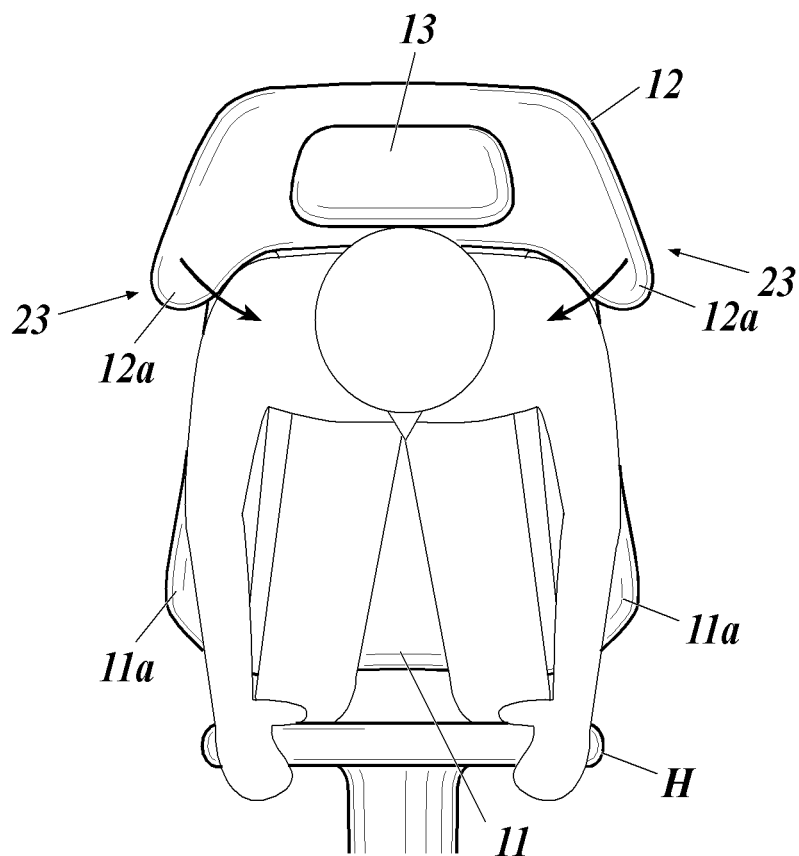
FIG. 5A is an illustration to explain an overview of an occupant protection system.
Figure 5B:
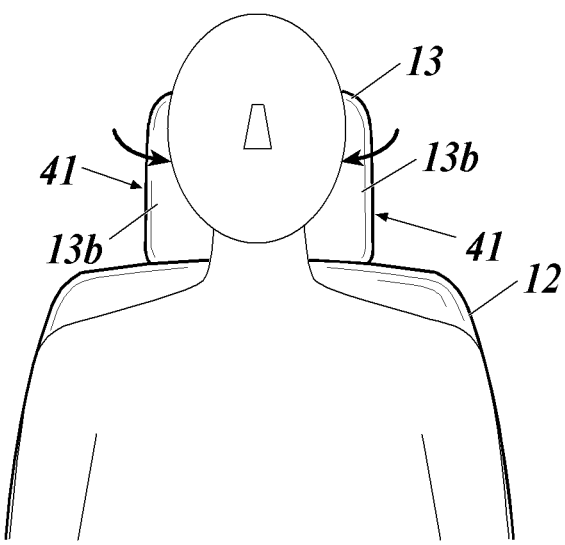
FIG. 5B is an illustration to explain an overview of an occupant protection system.
Figure 6:
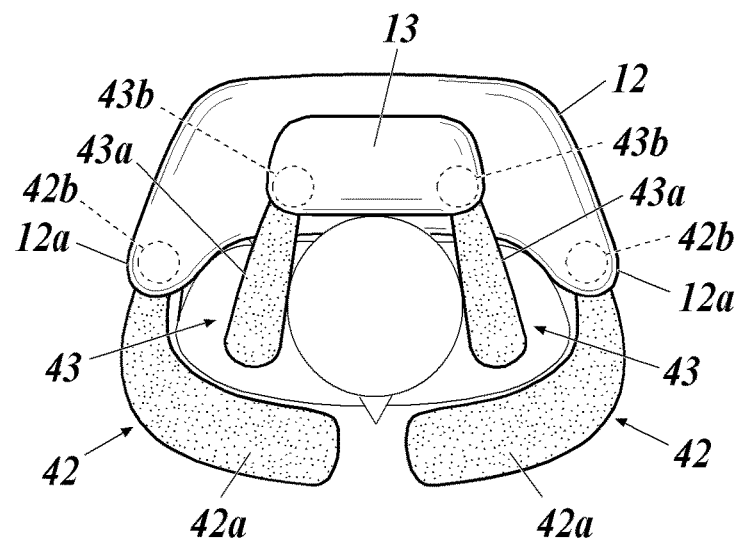
FIG. 6 is an illustration to explain an overview of an occupant protection system.

As shown in FIGS. 5A, 5B, and 6, the protector includes enclosing means 23, 41, 42, and 43 which enclose and protect the occupant seated on the seat 10.

The enclosing means 23, 41, 42, and 43 correspond to multiple patterns with protection degrees different from each other according to the situation where an occupant is required to be protected. In the present embodiment, the protector includes a first enclosing means 23, a second enclosing means 41, a third enclosing means 42, and a fourth enclosing means 43.

The first enclosing means 23 is the above-described third angle changer 23 which changes the angles of the side supports 12a of the seat back 12. As shown in FIG. 5A, the first enclosing means 23 is configured to enclose the occupant's body by changing the angles of the side supports 12a inwards.

That is, the first enclosing means 23 includes a movable mechanism which operates the cushion material constituting the side supports 12a. The seat controller 2 controls the motion of the movable mechanism.

The occupant can be supported and protected by such a first enclosing means 23 because the occupant's body can be enclosed by the side supports 12a of the seat back 12.

Corresponding to the side supports 12a of the seat back 12 enclosing the occupant's body in the present embodiment, the side supports 11a in the seat cushion 11 may enclose the occupant's buttocks.

The second enclosing means 41 changes angles of left and right side edges 13b of the headrest 13. As shown in FIG. 5B, the second enclosing means 41 is configured to enclose the occupant's head by changing the angles of the both side edges 13b inwards.

That is, the second enclosing means 41 includes a movable mechanism which operates the cushion material constituting both of the side edges 13b of the headrest 13. The seat controller 2 controls the motion of the movable mechanism.

The occupant can be protected by such a second enclosing means 41 because the occupant's head can be enclosed by the both side edges 13b of the headrest 13.

The second enclosing means 41 changes the angles of the both edges 13b of the headrest 13 inwards so as to enclose the head of the occupant in the present embodiment, but the present invention is not limited to this. For example, the second enclosing means 41 may be side support members protruding forwards (or having a convex shape) provided at both edges of the headrest 13 so as not to obstruct the visual field.

As shown in FIGS. 1 and 6, the third enclosing means 42 is provided with airbags 42a and airbag actuators 42b on the side supports 12a of the seat back 12. The airbags 42a extend to the front side of the occupant's body when activated, to enclose the occupant's body. The airbag actuators 42b activate the airbags 42a according to the control by the seat controller 2.

The third enclosing means 42 provides stronger protection than the first enclosing means 23 which also uses the side supports 12a, and activated when the vehicle V is in a collision or is anticipated to be in a collision.

The airbags 42a are formed in a curved manner to cover from the side supports 12a of the seat back 12 to the occupant's body.

The occupant can be protected more reliably by such a third enclosing means 42, because the occupant's body can be enclosed more widely by the activated airbags 42a when the vehicle V is in a collision or is anticipated to be in collision.

The fourth enclosing means 43 is provided with airbags 43a and airbag actuators 43 on the side edges 13b of the headrest 13. The airbags 43a enclose the occupant's head when activated. The actuators 43 activate the airbags according to the control by the seat controller 2.

The fourth enclosing means 43 provides stronger protection than the second enclosing means 41 which also uses the headrest 13, and activated when the vehicle V is in a collision or is anticipated to be in a collision.

The airbags 43*a* are formed so as to protrude forwards from the respective edges of the headrest 13.

The occupant can be protected more reliably by such a fourth enclosing means 43, because the occupant's body can be enclosed more widely by the activated airbags 43*a* when the vehicle V is in a collision or is anticipated to be in a collision.

Figure 7:
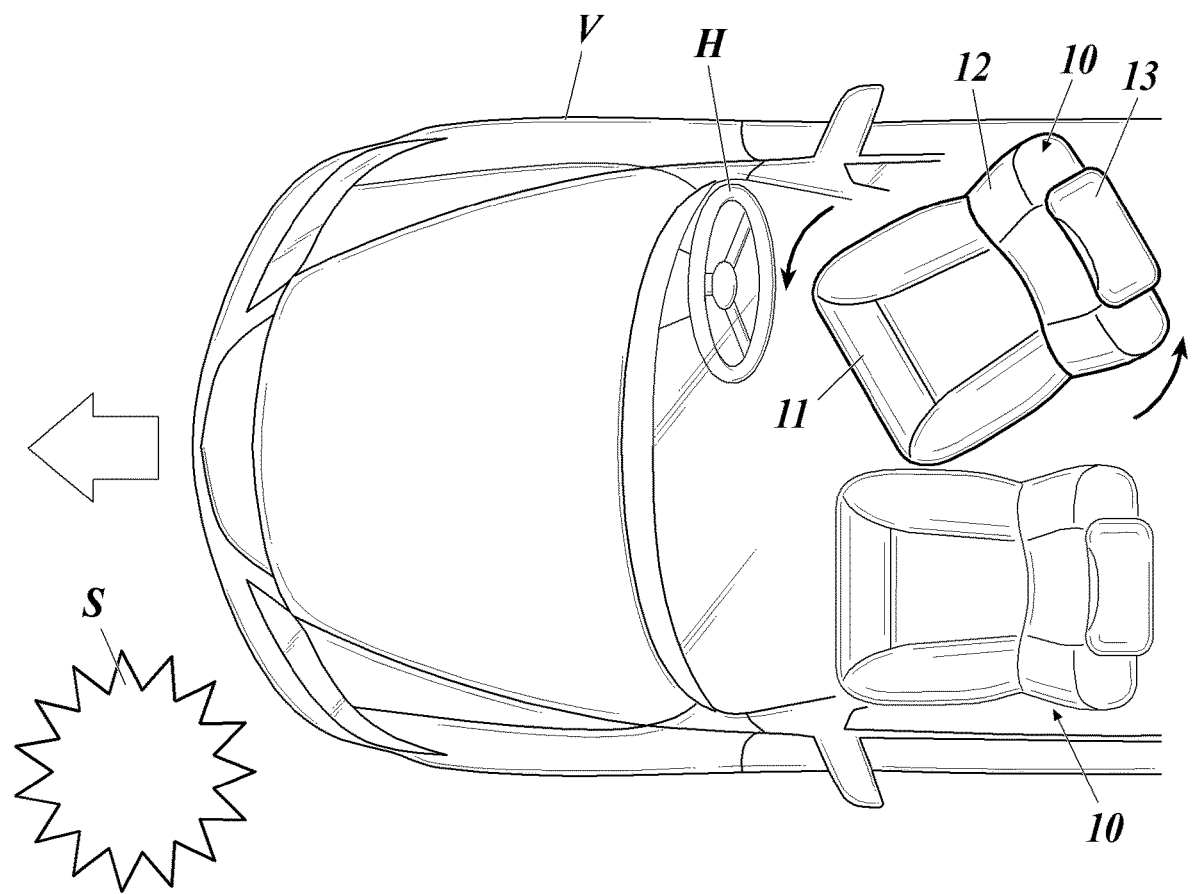
FIG. 7 is an illustration to explain an overview of an occupant protection system.

FIG. 7 shows another example of the protector. The protector in FIG. 7 includes a seat rotating means which rotates the seat 10 depending on the direction of an impact load applied to the vehicle V from the outside. The seat rotating means is constituted by the seat rotator 26 described above.

The occupant can be seated on a seat for a vehicle including a seat cushion and a seat back, which is not limited to the seat 10 in the present embodiment, in a condition where the occupant can brace himself against an impact load from the front. Therefore, when the seat 10 is rotated by the seat rotator 26, which is a seat rotating means, so as to be adjusted to the direction of an impact load applied from the outside to the vehicle V, the occupant seated on the seat 10 is in a condition capable of bracing himself and can robustly withstand the impact load.

In consideration of passenger protection, the seat 10 is desirably rotated so as to completely match the direction of the impact load. If there is not enough time, the seat 10 is rotated even a little.

In the present embodiment, only the seat rotator 26 is described as the seat rotating means. However, the above-described seat slider 27 may be used when the seat 10 needs to be slid in consideration of the space inside the vehicle and the positional relationship with the other seats 10.

The motion of the protector shown in FIGS. 5A to 7 is controlled by the seat controller 2 as the protector controller. There are various situations where protection of the occupant is required as described below.

The seat controller 2 as the protector controller controls the motion of at least one of the various protectors described above when the driving controller 1 switches autonomous driving of the vehicle V to manual driving.

The timing for switching autonomous driving to manual driving is, as described above, the timing when the leadership for driving the vehicle V is transferred from a computer to a human. Therefore, it is a situation where protection of the occupant is required.

The protector (first enclosing means 23, second enclosing means 41) shown in FIGS. 5A and 5B is preferable as the protector for switching autonomous driving to manual driving so as not to disturb manual driving by the occupant.

The seat controller 2 as the protector controller controls the motion of at least one of the various protectors described above when the driving controller 1 detects a system abnormality related to autonomous driving.

When a system abnormality related to autonomous driving is detected, an appropriate protector is selected according to the detected abnormality because the way how the vehicle V is driven depends on the detected abnormality.

For example, if autonomous driving is switched to manual driving as a result of the system abnormality related to autonomous driving, the protector (first enclosing means 23, second enclosing means 41) as shown in FIGS. 5A and 5B is selected. If driving of the vehicle V becomes impossible as a result of the system abnormality related to autonomous driving, the protector (third enclosing means 42, fourth enclosing means 43) as shown in FIG. 6 is selected. That is, because there are multiple patterns with protection degrees different from each other according to the situation where protection of the occupant is required, the enclosing means is selected according to the situation.

The seat controller 2 as the protector controller controls the motion of at least one of the various protectors described above depending on the detection result of the driver's condition detected by the health condition detector 32 in the driver condition detector 30.

The health condition detector 32 detects the health condition of the driver as described above. An appropriate protector is selected depending on the health condition of the driver. In particular, it is desirable to select a protector depending on whether or not the driver is conscious, to use several protectors in combination, and the like.

The seat controller 2 as the protector controller controls the motion of at least one of the various protectors described above when the vehicle V during autonomous driving collides with an obstacle S and the like.

When the vehicle V collides with an obstacle S and the like, an impact load is applied from the outside to the vehicle V. Therefore, it is a situation where protection of the occupant is required.

As the protector when such a vehicle V collides with the obstacle S or the like, either of the protector (third enclosing means 42, fourth enclosing means 43) shown in FIG. 6 or the protector (seat rotator 26) shown in FIG. 7 may be selected. Alternatively, both may be selected.

The seat controller 2 as the protector controller controls the motion of at least one of the various protectors described above when the vehicle V in autonomous driving avoids the obstacle S and the like.

When the vehicle V avoids the obstacle S and the like, for example, the vehicle V may curve sharply or stop suddenly. Therefore, it is a situation where protection of the occupant is required.

When the vehicle V avoids an obstacle S and the like in this way, a protector (first enclosing means 23, second enclosing means 41) as shown in FIGS. 5A and 5B is preferably selected so that the occupant can withstand centrifugal force in a sharp curve or a protector (third enclosing means 42) as shown in FIG. 6 is preferably selected so as to suppress the forward motion of the occupant.

As described above, the occupant protection system (vehicle control system) includes the surrounding situation detector 3 which detects the surrounding situation of the vehicle V. The surrounding situation detector 3 can detect the presence or absence of the obstacle S or the like. Therefore, the various protectors described above are selected based on information obtained from the surrounding situation detector 3.

Because the occupant protection system configured as described above is incorporated in the vehicle V, the occupant can be protected in a situation where the occupant seated on the seat 10 is required to be protected.

According to the present embodiment described above, when the seat 10 is in the form during autonomous driving, the driving controller 1 can control the vehicle V such that autonomous driving does not switch to manual driving. Therefore, it is possible to prevent autonomous driving from switching to manual driving before the form of the seat 10 changes from the form during autonomous driving to the form during manual driving. Therefore, it is possible to improve safety when autonomous driving is switched to manual driving.

Furthermore, the motion amount when the form of the seat 10 is changed from the form during manual driving to the form during autonomous driving can be limited in consideration of the time required to switch autonomous driving to manual driving. Therefore, the timing of switching autonomous driving to manual driving can be adjusted to the timing of changing the form of the seat 10 from the form during autonomous driving to the form during manual driving. Therefore, it is possible to improve safety when autonomous driving is switched to manual driving.

Furthermore, because the seat controller 2 controls the motion speed when changing the form of the seat 10, the motion timing for changing the form of the seat 10 can be adjusted to the timing of switching between autonomous driving and manual driving. This makes it possible to improve safety in switching between autonomous driving and manual driving.

Furthermore, the motion of the seat 10 can be delayed when the form is changed and adjusted to the timing of switching autonomous driving to manual driving, and the occupant has enough time to prepare for manual driving. Therefore, it is possible to improve safety when autonomous driving is switched to manual driving.

Furthermore, the seat controller 2 controls the motion speed of the seat 10 separately in the forced switching mode and in the voluntary switching mode. Therefore, the seat 10 can be operated at a speed suitable for each mode. Therefore, it is possible to improve safety when autonomous driving is switched to manual driving.

Furthermore, if autonomous driving is not desirably switched to manual driving as a result of driver condition detection, the vehicle V can be controlled so that autonomous driving is not switched to manual driving. Therefore, it is possible to improve safety when autonomous driving is switched to manual driving.

Furthermore, because the seat condition detector 31 in the driver condition detector 30 detects whether or not the driver is seated on the seat 10, autonomous driving is prevented from switching to manual driving when the driver is not seated in the seat 10 (driver's seat). Therefore, it is possible to improve safety when autonomous driving is switched to manual driving.

Furthermore, because the health condition detector 32 in the driver condition detector 30 detects the health condition of the driver, autonomous driving is prevented from switching to manual driving when the driver is in a health condition in which driving is not possible. Therefore, it is possible to improve safety when autonomous driving is switched to manual driving.

Furthermore, when the driving controller 1 switches autonomous driving of the vehicle V to manual driving, the seat controller 2 can also control the motion of, in addition to the driver's seat 10, the other seat (s) 10 to change from the form during autonomous driving to the form during manual driving. Therefore, forms of multiple seats 10 can be changed simultaneously from the form during autonomous driving to the form during manual driving.

Furthermore, the seat controller 2 preferentially controls the motion of the driver's seat 10 among the multiple seats 10, so as to change the form of the driver's seat 10 to the form during manual driving earlier than the other seat(s) 10. Therefore, it is possible to improve safety when autonomous driving is switched to manual driving.

Furthermore, the seat 10 includes a protector which protects the occupant in a situation where protection of the occupant seated on the seat 10 is required, and a protector controller (seat controller 2) which controls the motion of the protector. Therefore, in a situation where the occupant seated on the seat 10 is required to be protected, the protector controller can control the motion of the protector and protect the occupant. Therefore, it is possible to ensure the safety of the occupant when the seat 10 in the form during autonomous driving is returned to be in the form suitable for manual driving.

Furthermore, whether or not in an emergency, the protector can always ensure the safety of the occupant when the seat 10 in the form during autonomous driving is returned to be in the form suitable for manual driving.

Furthermore, when an abnormality occurs in the system related to autonomous driving and when the seat 10 in the form during autonomous driving is returned to be in the form suitable for manual driving, the protector can ensure the safety of the occupant.

Furthermore, according to the detection result of the driver's condition by the driver condition detector 30, the protector can ensure the safety of the occupant.

Furthermore, when the vehicle V during autonomous driving collides with an obstacle S or the like, the protector can ensure the safety of the occupant.

Furthermore, when the vehicle V during autonomous driving avoids the obstacle S and the like, the protector can ensure the safety of the occupant.

Furthermore, as soon as the surrounding situation detector 3 detected the presence or absence of the obstacle S and the like in the surrounding situation of the vehicle V, the protector can protect the occupant. Thus, the protector can contribute to ensuring the safety of the occupant.

Furthermore, the protector including the enclosing means 23, 41, 42, and 43 which enclose and protect the occupant can ensure the safety of the occupant more easily than the protector which does not enclose the occupant.

Furthermore, the enclosing means 23, 41, 42, and 43 correspond to multiple patterns with protection degrees different from each other according to the situation where protection of the occupant is required. Therefore, they can contribute to ensuring occupant's safety by protecting the occupant in an appropriate condition for each situation where protection of the occupant is required.

Furthermore, because the protector includes the seat rotator 26 which rotates the seat 10 depending on the direction of the impact load applied to the vehicle V from the outside, the protector can protect the occupant by rotating the seat 10 to be in a direction such that the occupant can easily brace himself against the impact load.

Furthermore, the multiple forms of the seat 10 include a form suitable for manual driving and a form not suitable for manual driving. The safety of the occupant who drives the vehicle V can be improved in the form suitable for manual driving, and the comfort of the occupant can be improved in the form not suitable for manual driving where the occupant can be in any posture.

Furthermore, because the form of the seat 10 not suitable for manual driving is changed by the seat controller 2, it becomes suitable for autonomous driving. Therefore, the comfort during autonomous driving can be improved.

Furthermore, because the seat 10 can be changed into various patterns depending on the selection by the occupant, comfort during autonomous driving can be improved.

Furthermore, the first angle changer 21 and the second angle changer 22 can respectively change the angle of the seat cushion 11 and the angle of the seat back 12 until they are in a flat condition. Therefore, the seat 10 can be used like a bed, and comfort during autonomous driving can be improved.

Furthermore, the third angle changer 23 can change the angles of the side supports 11a and 12a respectively provided in the seat cushion 11 and in the seat back 12 until they are in a flat condition. Therefore, the occupant feels free and comfort during autonomous driving can be improved. Furthermore, because the occupant can be seated without being held by the side supports 11a and 12a and easily perform motions other than driving.

Furthermore, the fourth angle changer 24 can change the angle of the headrest 13 until it is in a flat condition with respect to the front surface of the seat back 12. As a result, the occupant's neck angle can be adjusted, so that comfort during autonomous driving is improved.

Furthermore, the fifth angle changer 25 can change the angle of the footrest 14 until it is in a flat condition with respect to a sitting surface of the seat cushion 11. As a result, the occupant can be seated extending his legs, and comfort during autonomous driving can be improved.

Furthermore, because the seat controller 2 can control the first to fifth angle changers 21 to 25 simultaneously, the seat 10 can be changed to various patterns, or immediately change to a bed-like condition from a form suitable for manual driving. Therefore, comfort during autonomous driving can be improved.

Furthermore, the occupant seated on the seat 10 which is not in the form suitable for manual driving can use the auxiliary function unit which assists the occupant's work. As a result, the occupant can use the auxiliary function unit for his work, and comfort during autonomous driving can be improved.

Furthermore, the occupant can manually adjust the seat 10 which has been changed to a form suitable for manual driving. Therefore, the occupant can drive the vehicle V while having a most suitable posture for manual driving, and safety can be improved.

INDUSTRIAL APPLICABILITY

The vehicle control system according to the present invention has high industrial applicability because it can improve safety during vehicle operation.

REFERENCE SIGNS LIST

1 Driving Controller
2 Seat Controller (Protector Controller)
3 Surrounding Situation Detector
10 Seat
11 Seat Cushion
11a Side Support
12 Seat Back
12a Side Support
13 Headrest
13a Side Edge
14 Footrest
20 Seat Form Changer
21 First Angle Changer
22 Second Angle Changer
22a Rotation Shaft
23 Third Angle Changer
24 Fourth Angle Changer
24a Rotation Shaft
25 Fifth Angle Changer
25a Rotation Shaft
26 Seat Rotator
27 Seat Slider
28 Seat Appearance Detector
30 Driver Condition Detector
31 Seated Condition Detector
32 Health Condition Detector
40 Protector
41 Second Enclosing Means
42 Third Enclosing Means
42a Airbag
42b Airbag Actuator
43 Fourth Enclosing Means
43a Airbag
43b Airbag Actuator

The invention claimed is:

1. A vehicle control system comprising:
a driving controller that switches between autonomous driving and manual driving of a vehicle;
a seat whose form is changed between multiple forms; and
a seat controller that controls motion of the seat upon change of a form of the seat,
wherein the multiple forms include a first form suitable for manual driving and a second form not suitable for manual driving,
the seat controller controls a first speed of first motion of the seat during change from the second form to the first form and a second speed of second motion of the seat during change from the first form to the second form, and
the seat controller controls the first speed and extends required time for the first motion,
wherein the seat includes:
a seat cushion that holds buttocks of an occupant seated on the seat;
a seat back that has a lower edge supported by the seat cushion;
a side support that has an obliquely convex shape and holds the occupant;
a headrest that is provided at an upper edge of the seat back and supports a head of the occupant;
a footrest that is provided at a front edge of the seat cushion and supports a foot of the occupant;
a first angle changer that is controlled by the seat controller and changes a first angle of the seat cushion, the first angle being changeable until the seat cushion is in a flat condition;
a second angle changer that is controlled by the seat controller and changes a second angle of the seat back, the second angle being changeable until the seat back is in a flat condition;
a third angle changer that is controlled by the seat controller and changes a third angle of the side support, the third angle being changeable until the side support is in a flat condition;
a fourth angle changer that is controlled by the seat controller and changes a fourth angle of the headrest, the fourth angle being changeable until the headrest is in a flat condition with respect to a front surface of the seat back; and
a fifth angle changer that is controlled by the seat controller and changes a fifth angle of the footrest, the fifth angle being changeable until the footrest is in a flat condition with respect to a sitting surface of the seat cushion, and the seat controller is configured to control the first angle changer, the second angle changer, the third angle changer, the fourth angle changer, and the fifth angle changer simultaneously.

2. The vehicle control system according to claim 1, wherein, upon the driving controller switching manual driving of the vehicle to autonomous driving of the vehicle, the second form is a form of the seat changed by the seat controller.

3. The vehicle control system according to claim 2, wherein the second form includes multiple forms, and
the seat controller controls motion of the seat to be in a form among the multiple forms that is selected by an occupant seated on the seat.

4. The vehicle control system according to claim 1, further comprising:
an auxiliary function unit that assists an occupant seated on the seat in the second form.

5. The vehicle control system according to claim 1, wherein the seat that is in the first form is adjustable by manual operation by an occupant seated on the seat.

6. The vehicle control system according to claim 1, wherein upon the vehicle being in a collision or being anticipated to be in a collision, the seat controller controls a first airbag on the seat back and causes the first airbag to enclose a body of an occupant seated on the seat.

7. The vehicle control system according to claim 1, wherein upon the vehicle being in a collision or being anticipated to be in a collision, the seat controller controls a second airbag on the headrest and causes the second airbag to enclose the head.

* * * * *